Feb. 8, 1944.  E. B. MALOON  2,341,151
ROAD MAKING ATTACHMENT FOR TANKS
Filed Aug. 24, 1942  2 Sheets-Sheet 1
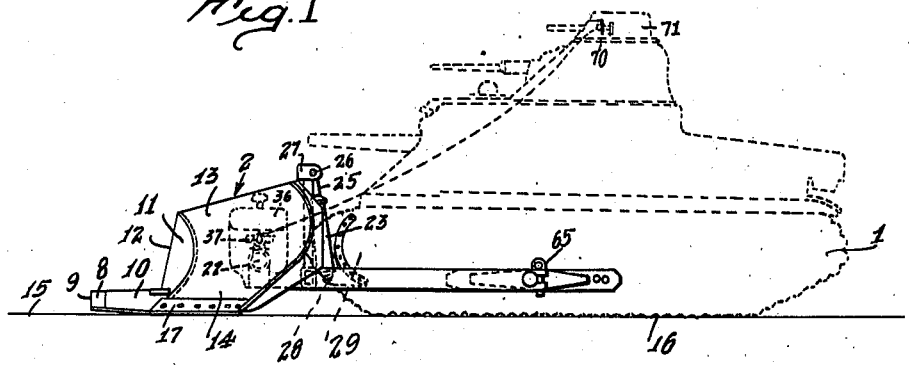
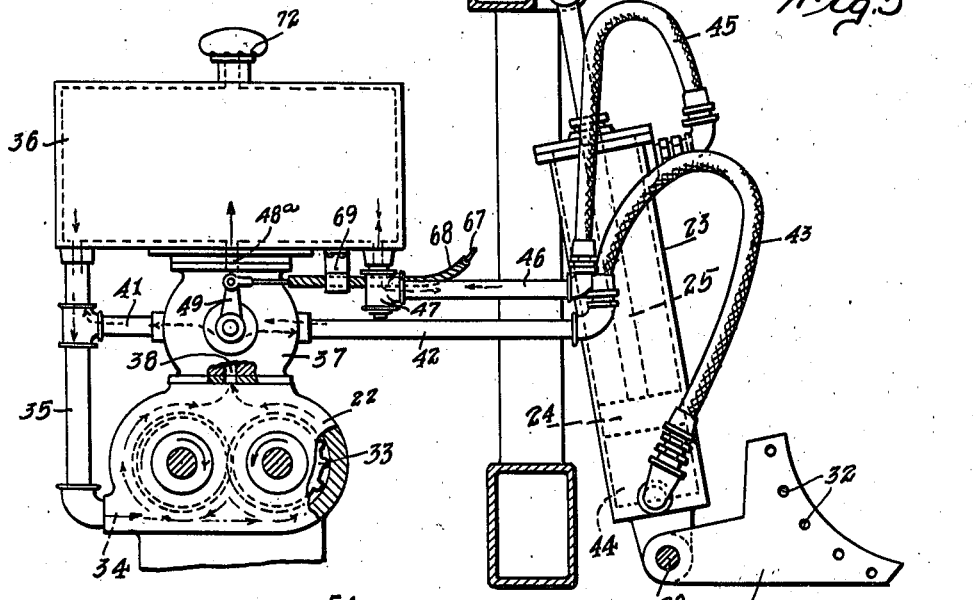
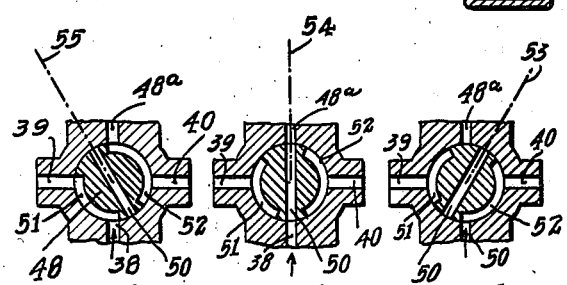
Inventor
Earl B. Maloon
By Lyon & Lyon
Attorneys

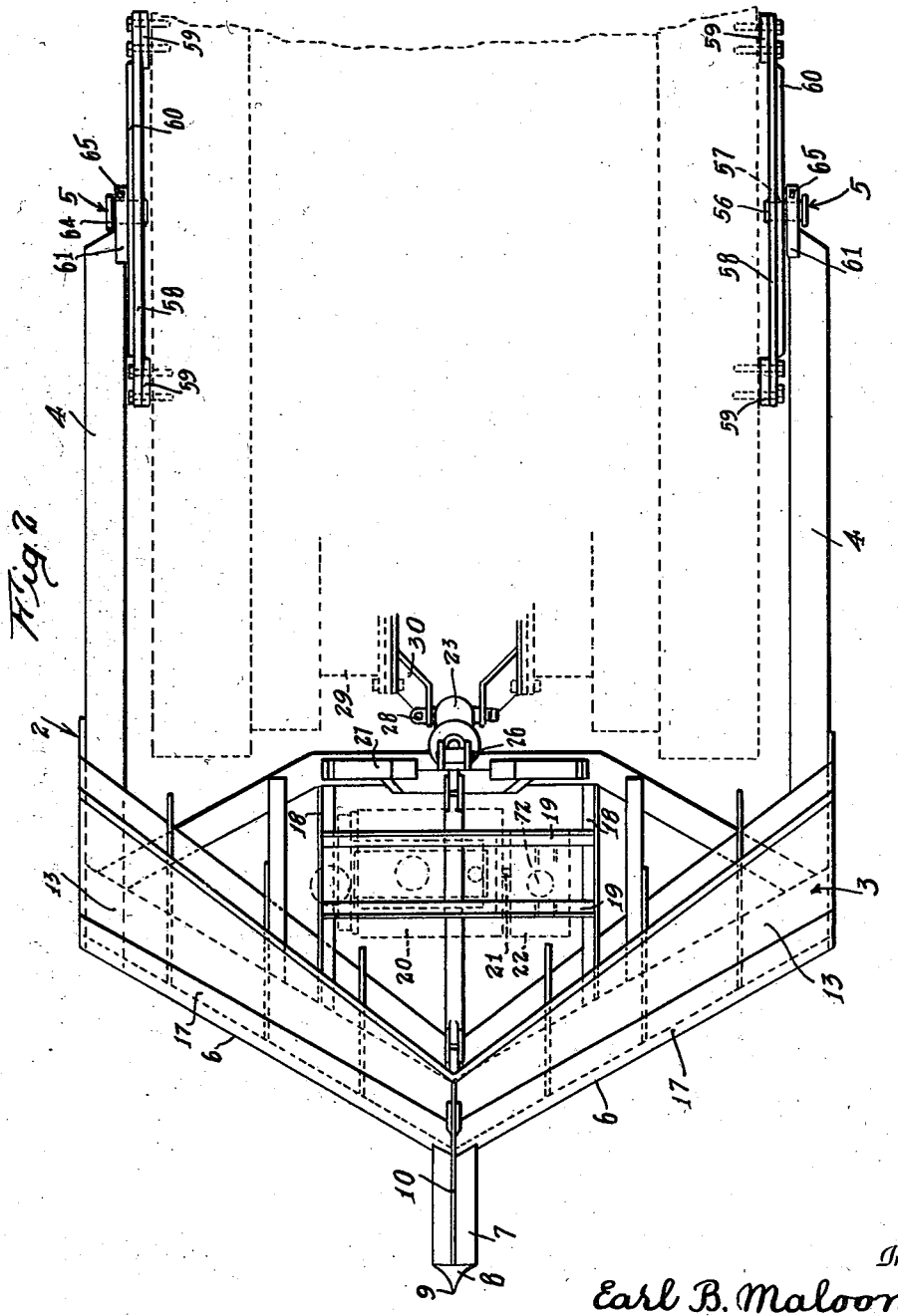

Patented Feb. 8, 1944

2,341,151

UNITED STATES PATENT OFFICE 2,341,151

ROAD-MAKING ATTACHMENT FOR TANKS

Earl B. Maloon, Alhambra, Calif., assignor to Southwest-Welding & Mfg. Co., Alhambra, Calif., a corporation of California Application August 24, 1942, Serial No. 455,861

6 Claims. (Cl. 37—172)

This invention relates to a road-building attachment to be employed at the forward end of a tank, tractor, or the like. The attachment is intended particularly for use at the forward end of a military tank for clearing away obstructions and leveling off the ground to form a roadway, and while the attachment can be used on any character of terrain, it is intended especially for facilitating the building of roads through desert country.

The principal object of the invention is to provide a bulldozer having a structure which will facilitate the ready attachment of the same to the forward end of a tank, and which attachment will be self-contained and operate independently of any power-developing mechanism on the tank itself.

A further object of the invention is to provide a construction in which the level of the bulldozer relative to the tank, can be readily controlled from a point on the tank.

A further object of the invention is to provide a bulldozer and frame construction which can be readily controlled as suggested above, as to its level, but in which the frame is weighted by the power plant on the bulldozer frame, to such an extent as to insure that it will maintain itself at a substantially fixed level at which it may be supported by the controllable suspension means that suspends or supports the bulldozer frame on the tank.

A further object of the invention is to provide means for quickly disconnecting the attachment from the tank when desired.

The invention consists in the novel parts and combination of parts to be described hereinafter, all of which contribute to produce an efficient road-making attachment for tanks.

A preferred embodiment of the invention is described in the following specification, while the broad scope of the invention is pointed out in the appended claims.

In the drawings:

Fig. 1 is a side elevation of the attachment, and representing its relation to the tank which is indicated in dotted lines.

Fig. 2 is a plan of the attachment upon an enlarged scale, and indicating its relation to the forward end of the tank which is indicated in dotted lines. This view indicates the position of the motor or internal combustion engine and the pump which I prefer to employ in connection with the power plant of the bulldozer.

Fig. 3 is a fragmentary side elevation with certain parts broken away and shown partially in section.

Fig. 4 is a side elevation in partial section, showing the general arrangement of the power plant and its connection to the fluid-operated means that supports the forward end of the bulldozer frame on the tank.

Fig. 5 is a vertical section taken through the valve casing and valve, and particularly illustrating the valve ports and the manner in which they can cooperate with the fluid connections for controlling the flow of the fluid under pressure through a pressure-controlled means for supporting the forward end of the bulldozer frame on the tank. In this position of the valve, the bulldozer is floating. Figs. 6 and 7 are sections similar to Fig. 5 but showing the valve respectively in the holding position and the raising position for the bulldozer.

Referring more particularly to the parts, 1 indicates the tank in outline, and 2 indicates my attachment which is located forward of the tank. This attachment includes a frame 3 which preferably includes two side forks 4 that are identical in construction. Near the rear ends of these forks they are secured to the side wall of the tank by a flexible or pivotal connection 5, which will be described more in detail hereinafter. The forward portion of the frame 3 constitutes a bulldozer 6 which may be of any suitable construction for clearing away bushes, or any vegetable growth, and for deflecting the same with or without earth in front of the bulldozer, to either side. In the present instance, the bulldozer includes a forwardly extending tongue 7 with a tapered spur 8 at its forward end, terminating in a short substantially vertical cutting edge 9, and on the upper side of this tongue a slightly inclined cutting edge 10 is formed, which extends back to a vertical plate 11 presenting a cutting edge 12, which is nearly vertical, but which preferably inclines toward the rear in an upward direction. At each side of the central plate 11 inclined deflector plates 13 are built into the structure, and these plates incline rearwardly in an outward direction, and are of substantially concavo-convex form as indicated in Fig. 1, terminating below in inclined extensions 14, the lower edges of which are located substantially at the ground level 15, that is to say, in substantially the same plane as the bottom run 16 of the endless tread of the tank. At this bottom edge a reinforcing cutter 17 may be secured to the deflector plates 13, and this cutter is preferably in the form of a blade with a cutting edge located at or about the ground level.

The bulldozer, of course, operates not only to cut away any vegetable growth, but also operates as a plow to plow through the earth in front of the tank, and deflect the same to each side. Of course, as the tank advances, the bottom run 16 of the endless tread presses down and compacts the earth or sand that has been leveled off by the bulldozer. This action of the tank, of course, corresponds somewhat to rolling the leveled-off crude roadway that is formed by the bulldozer operating as a plow.

To the rear of the forward end of the bulldozer, and at a low level in its framework, the bed for the power plant is provided, which may include two bars or angle irons 18 (see Fig. 2) that support transverse bars or angle irons 19 on which the power plant of the bulldozer is located. This power plant would include a motor which is preferably an internal combustion engine, the position of which is indicated by the dotted outline 20. This engine has a horizontal shaft 21 which drives a pump 22, the position of which is indicated in dotted lines in Fig. 2, and the general construction of which is indicated in Fig. 4. While this element 22 is preferably a hydraulic pump, it should be understood that I do not limit myself to this particular means for developing fluid pressure. Any source of fluid pressure may be provided as an element of the power plant, but I prefer to employ a motor such as a gas engine for developing fluid pressure, because such a motor has considerable weight and performs the advantageous function of weighting the bulldozer sufficiently to insure that it will maintain itself ordinarily, at any level at which it is supported.

The mechanism includes means for suspending or supporting the forward end of the frame 3 from the forward portion of the tank, in such a way that it can be held in a "floating" condition, that is to say, in such a way that it rests by its own weight on the ground. This mechanism also operates so that when desired, the bulldozer can be held in a fixed position, that is to say, it will not yield in a downward direction, and so that it virtually becomes a rigid part of the tank structure. In order to accomplish this, I provide suspension means for supporting and controlling the frame 3 at the forward end of the tank. In the present instance, this means includes a hydraulic cylinder 23 and piston or plunger 24 having a piston rod 25 that extends out through the upper head of the cylinder, and is connected by a horizontal pivot connection 26 to a transverse upper bolster 27 that extends across in front of the tank on its front-and-rear axis. The cylinder 23 is preferably disposed in a slightly inclined position as illustrated in Fig. 4, its lower end being supported on a horizontal pivotal connection 28 secure to the tank casing 29 at each side of the longitudinal axis, by means of bracket arms 30 as illustrated in Fig. 2 or by means of brackets 31 having the general form (see Fig. 4) of gusset plates. These gusset plates 31 may be attached by means of bolts applied through bolt holes 32 extending along the outline of the inner flange of the endless tread casing at each side.

The pump 22 illustrated, is of the gear type, including two gear type impellers 33 that mesh together and are driven in the direction indicated by the arrows in Fig. 4. The inlet connection 34 for the pump, is supplied with the operating liquid through a substantially vertical duct or pipe connection 35 that leads down from the reservoir or expansion tank 36 which is located at a slight elevation above the pump, and preferably supported on the upper flange of a valve casing 37. This valve casing 37 has an inlet port 38 leading into it from the pump, and two outlet ports 39 and 40, the former of which has a connection 41 leading into the supply pipe 35, and the latter of which has a connection 42 leading over to a point near the cylinder 23 at which an elbow may be provided, connecting to a flexible hose 43. The lower end of this flexible hose delivers the oil or other operating liquid under pressure, into the pressure chamber 44 in the cylinder, and below the piston 24.

The upper chamber in the cylinder located above the piston 24, is connected through an elbow at the upper end of the cylinder to a flexible connection or hose 45, the other end of which is attached to a horizontal pipe connection 46 that is connected through the bottom of the expansion tank 36 to the interior of the tank. This may be accomplished through a T-connection 47 secured to the tank bottom.

There is a valve in the valve casing 37, which is preferably of the plug-cock type including a plug 48 rotatable on a horizontal axis, and provided with an operating lever 49. This plug 48 has four ports cooperating respectively with the inlet 38 from the pump, and with the two outlet ports 39 and 40 that communicate with the supply duct 35 and the pipe connection 42 leading over to the pressure chamber 44 under the piston 24; and a port 48—a leading up into the expansion tank 36. These ports in the plug, include a diametrical port 50 (see Fig. 5) and two lateral arcuate ports 51 and 52. The valve has three operating positions in which the lever 49 may occupy the position indicated by the three radial lines 53, 54, and 55. When the lever is in the position indicated by the line 53, the valve port 52 connects port 38 to port 40, maintaining communication through the connection 42 and the hose 43 to the under side of the piston 24, and developing sufficient pressure to raise the piston and the bulldozer frame. In the valve position shown in Fig. 5 the pump discharge is by-passed through connection 41, while the pressure chamber 44 communicates with the expansion tank 36. This lets the weight of the bulldozer rest on the ground.

If the lever 49 is held in mid position, that is, in the position indicated by the line 54, flow through the port 40 into the valve casing to the pressure chamber 44, will be closed, and this will hold the bulldozer up to a fixed elevation with relation to the tank.

The pivotal connections 5 are preferably constructed so that they can be readily disconnected at will. This is desirable in case there is an attack by an enemy while the tank is operating with the attachment. This enables the tank to free itself quickly from the attachment which can be abandoned temporarily.

For this purpose each pivotal connection 5 includes a pintle 56 that is mounted in an opening 57 that is formed through a bar 58, the ends of which are welded to seats or pads 59 bolted to the side of the tank and reinforced by a bar 60 to increase the strength of this support for the pintle. At the rear end of each fork 4 a connection block 61 is provided that may be formed as an integral part of the fork, and this block has a U-shaped socket 62 passing back into the same from its vertical end face 63 (see Fig. 3). This U-shaped socket 62 fits on the pintle back of an integral head 64 on the pintle, and is held on the pintle by a cotter pin 65 dropped down through the block from above, and through a guide opening 66 formed through the end of the block for this cotter. Any suitable means may be provided for operating the valve lever 49. This, however, is preferably a flexible connection arranged with loops that will permit the bulldozer to move up or down without making any substantial change in the position of the lever 49. This connection preferably is in the form of a flexible push and pull stem 67 mounted in a flexible sheath 68. The lower end of this sheath is clamped in a substantially horizontal position in a bracket 69.

The upper end of this operating stem 67 is carried in a clamp indicated by the dotted lines 70 in Fig. 1, that would be secured within reach of the operator in the top turret 71 of the tank.

The gasoline engine 20 would have a supply tank of its own for operating it. It need not be controlled from the tank 2, but would be started up by a man on the ground. It would be throttled to run at sufficient speed to develop the pressure required from the pump. When it is necessary to disconnect the attachment, of course, the pivotal connection 28 must be disconnected and the cylinder 23 would then be carried on the upper connection 26.

The tank 1 would be backed away from the bulldozer after the cotter pins 65 have been pulled out.

A breather valve 72 should be provided in the cover of the expansion tank to maintain atmospheric pressure in this tank.

Many other embodiments of the invention may be resorted to without departing from the spirit of the invention.

What I claim is:

1. In a road building attachment for a tank or the like, the combination of a bulldozer having a frame located in advance of the tank, means for supporting the rear end of the frame on the tank, a fluid-operated cylinder and piston for supporting the forward end of the frame on the tank, with a chamber in the cylinder to receive the operating fluid under pressure, a source of operating fluid under pressure supported on the frame for controlling the supply of operating fluid to the said pressure chamber to regulate the level at which the forward end of the frame is supported, means located on the bulldozer for regulating the supply of operating fluid from said source to said pressure chamber, and controlling means therefor operatable from the operator's position on the tank.

2. In a road building attachment for a tank or the like, the combination of a bulldozer having a frame located in advance of the tank, means for supporting the rear end of the frame on the tank, a fluid-operated cylinder and piston for supporting the forward end of the frame on the tank, with a chamber in the cylinder to receive the operating fluid under pressure, an internal combustion engine supported on the frame to the rear of the forward end of the bulldozer, a hydraulic pump also supported on the frame, driven by the engine, for supplying operating fluid under pressure to the said pressure chamber to regulate the level at which the forward end of the frame is supported, a valve casing with a supply duct leading therefrom to the inlet side of the pump, and a duct leading from said valve casing to the fluid-operated cylinder, and a valve in said valve casing for controlling the supply of the operating fluid to the last-named duct and to the first-named duct from the outlet side of the pump.

3. In a road building attachment for a tank or the like, the combination of a bulldozer having a frame located in advance of the tank, means for supporting the rear end of the frame on the tank, a fluid-operated cylinder and piston for supporting the forward end of the frame on the tank, with a chamber in the cylinder to receive the operating fluid under pressure, an internal combustion engine supported on the frame to the rear of the forward end of the bulldozer, a hydraulic pump also supported on the bulldozer frame, with a supply tank for the operating fluid located adjacent the pump, a supply duct leading from the lower portion of the tank to the inlet side of the pump, a valve casing having a connection to said supply duct and having a connection leading to said pressure chamber, and a connection from the other end of the cylinder to the supply tank, and a valve in said valve casing having ports for controlling the flow from the pump through the first-named connection to the first-named supply pipe, and through the connection to the pressure chamber, with means for manually controlling the valve at will; said valve capable of assuming a position in which it shuts off return flow through the valve from one end of said pressure chamber, so that the pressure in the closed-off end of the pressure chamber limits the level to which the bulldozer can descend relative to the tank, while permitting relatively free upward movement of the bulldozer over obstructions passing under the bulldozer.

4. In a road building attachment for a tank or tractor, the combination of a frame in the form of a yoke having a fork at each side of the tank with means for pivotally attaching the forks to the sides of the tank, a bulldozer head at the forward end of said frame including a plow for digging through earthy material in front of the tank and for diverting the same to the side, suspending means for suspending the frame on the tank, weighting means for the bulldozer consisting of a power plant supported on the frame forward of the tank; and means for utilizing the power developed in said power plant for actuating said suspension means to regulate the level of the bulldozer head.

5. In a road building attachment for a tank or tractor, the combination of a frame in the form of a yoke having a fork at each side of the tank with means for pivotally attaching the forks to the sides of the tank, a bulldozer head at the forward end of said frame including a plow for digging through earthy material in front of the tank, and for diverting the same to the side, suspending means including a fluid-operated cylinder connected with the tank and the frame for suspending the frame on the tank, weighting means consisting of a power plant supported on the frame forward of the tank for holding the bulldozer down while in action, and including pressure developing means for developing pressure in the fluid, with means for connecting the same to the cylinder for actuating the cylinder to regulate the level of the bulldozer head.

6. In a road-building attachment for a tank or tractor, the combination of a frame in the form of a yoke having a fork at each side of the tank with means for pivotally attaching the forks to the sides of the tank, a bulldozer head at the forward end of said frame including a plow for digging through earthy material in front of the tank, and for diverting the same to the side, and including an internal combustion engine, suspending means including a fluid-operated cylinder, and pressure developing means for developing pressure in the operating fluid, with means including hose for connecting the pressure developing means to the cylinder for actuating the same to regulate the level of the bulldozer head, and means operatable from the turret of the tank for controlling the flow of fluid under pressure to the fluid-operated cylinder.

EARL B. MALOON.